United States Patent Office 2,982,790
Patented May 2, 1961

2,982,790
TERMINALLY UNSATURATED POLYOLS AND PROCESS FOR THEIR PREPARATION

Louis F. Theiling, Jr., Charleston, and Robert J. Knopf, St. Albans, W. Va., assignors to Union Carbide Corporation, a corporation of New York No Drawing. Filed Sept. 16, 1958, Ser. No. 761,284

7 Claims. (Cl. 260—635)

This invention relates in general to a new series of polyols and more particularly to terminally unsaturated polyols and a process for their preparation.

Polyfunctional molecules are generally of great value in industry due to the presence of more than one reactive group within a given molecule. Such compounds can lead to a variety of useful reactions and products. Among the polyfunctional compounds are the polyols which find wide use in many fields. For example, both propylene glycol and glycerine are utilized as tobacco humectants, ethylene glycol finds extensive use in the manufacture of synthetic fibers, alkyd resins, antifreeze, and the polyethylene glycols have found broad acceptance in the pharmaceutical and cosmetic fields. These and other polyols are also used extensively as freezing point depressants, brake fluids, solvents, plasticizers and the like.

One of the more promising fields for polyols, particularly those containing an active double bond, is in the preparation of polyurethane elastomers. By employing an unsaturated diol or triol as part of the basic polyurethane polymer network the resulting polymer may be conveniently vulcanized by the conventional methods used for curing rubber. The presence of the double bond permits the vulcanization, for example, by sulfur, peroxides and the like. Thus, for example, a polymeric polyurethane can be prepared by reacting a polymeric glycol with an organic diisocyanate and the unsaturated polyol to obtain a polymer which can be cured with conventional curing agents in the presence of any necessary vulcanization accelerators. In general, with this method, the unsaturated polyol is used to the extent of about 1 to 10 percent in the final polyurethane elastomer formulation with about 0.5 to 10 parts by weight of sulfur or other curing agent per 100 parts of polymer necessary to effect the cure in the presence of appropriate accelerators. Curing at temperatures of about 125°–160° C. for from one half to several hours is generally sufficient. Depending on the particular polyurethane used, various modifications of the curing step may be employed.

It is, therefore, an object of the present invention to provide a new series of unsaturated polyols. A further object of the present invention is to provide new compositions of matter combining the properties of polyols and olefins in the same molecule. Another object is to provide new terminally unsaturated polyols. A further object of the present invention is to provide a process for preparing new terminally unsaturated polyols. Other objects and a fuller understanding of the present invention can be had by referring to the following detailed description.

In accordance with the practice of the present invention, a new series of terminally unsaturated polyols can be prepared from commercially available raw materials by means of a sequence of simple chemical reactions. These new compounds can be represented by the following general formula:

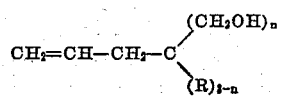

wherein $(n)$ is a whole positive integer of from 2 to 3 and R is an unsubstituted alkyl group containing from 1 to 10 carbon atoms and can be either straight chain or branched. Illustrative of the compounds of this invention are the following: 2,2-bis(hydroxymethyl)-4-pentenol, 2 - hydroxymethyl - 2-methyl-4-pentenol, 2-hydroxymethyl - 2-ethyl-4-pentenol, 2-hydroxymethyl-2-propyl-4-pentenol, 2 - hydroxymethyl-2-isopropyl-4-pentanol, 2-hydroxymethyl-2-n-butyl-4-pentenol, 2-hydroxymethyl-2-tertiary butyl-4-pentenol, 2-hydroxymethyl-2-heptyl-4-pentenol, and the like.

In the preparation of the compounds of this invention, a terminally unsaturated aldehyde having at least one hydrogen atom in the alpha position adjacent to the carbonyl group is subjected to an aldol condensation with at least one mole of formaldehyde followed by a Cannizzaro reaction with an additional mole of formaldehyde, wherein the aldehyde is reduced to the alcohol. The following reactions illustrate the sequence of steps using 4-pentenal as an example of the terminally unsaturated aldehyde:

(1) 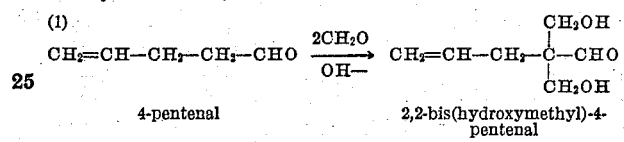

4-pentenal      2,2-bis(hydroxymethyl)-4-pentenal (2) 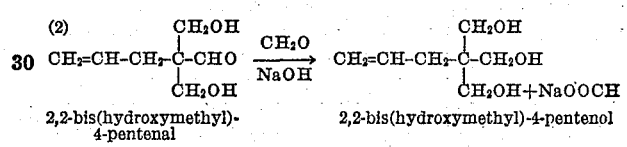

2,2-bis(hydroxymethyl)-      2,2-bis(hydroxymethyl)-4-pentenol
4-pentenal

In a similar manner, the alpha alkyl-substituted terminally unsaturated aldehydes will react to give the corresponding alkyl-substituted terminally unsaturated diol:

(1) 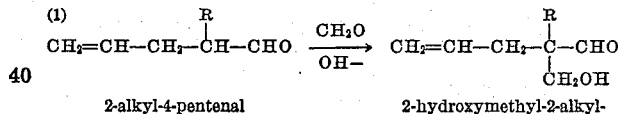

2-alkyl-4-pentenal      2-hydroxymethyl-2-alkyl-4-pentenal (2) 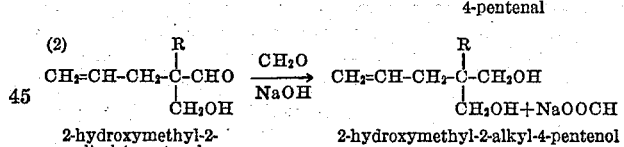

2-hydroxymethyl-2-     2-hydroxymethyl-2-alkyl-4-pentenol
alkyl-4-pentenal wherein R is the same as defined above. Other terminally unsaturated aldehydes will react in a like manner to give the corresponding polyol as long as the carbon atom adjacent to the carbonyl group has at least one hydrogen atom. Thus for example 2-methyl-4-pentenal, 2-ethyl-4-pentenal, 2-propyl-4-pentenal, 2-n-butyl-4-pentenal and 2-heptyl-4-pentenal, when reacted according to the process of this invention will give respectively: 2-hydroxymethyl-2-methyl-4-pentenol, 2-hydroxymethyl-2-ethyl-4-pentenol, 2-hydroxymethyl-2-propyl-4-pentenol, 2-hydroxymethyl-2 - n - butyl-4-pentenol, and 2-hydroxymethyl-2-heptyl-4-pentenol.

In a preferred embodiment of the process of the present invention, a 50 percent sodium hydroxide solution is added dropwise to a mixture of approximately one mole of the terminally unsaturated aldehyde and approximately two to three moles of formaldehyde employed as 37 percent formalin solution while the mixture is continuously stirred. Addition of the hydroxide is maintained at such a rate that the reaction temperature remains within a range of from about 40° C. to about 70° C. and preferably from about 50° C. to about 55° C. When approximately one mole of the hydroxide has been added, the temperature is increased to about 90° C. to complete the reduction of the aldehyde group. Upon completion of the reaction, the pH of the solution is adjusted to 6.0 by the addition of an acid such as formic acid, after which the solution is concentrated by distillation under reduced pressure of about 20 millimeters of mercury. The resulting two phases are separated, and the diol distilled from the organic layer. Other hydroxides such as potassium hydroxides may be used to promote both the aldol condensation step and the Cannizzaro reaction.

The terminally unsaturated aldehydes, which are the starting materials for the present invention, can be prepared by methods known to the art. Both 4-pentenal and alpha-alkyl-substituted 4-pentenals can be prepared by rearrangement of vinyl allyl ether and the 1-alkenyl allyl ether respectively.

The following examples are given to illustrate the practice of the present invention:

EXAMPLE I

2,2-bis(hydroxymethyl)-4-pentenol

To a well-stirred mixture of 756 parts 4-pentenal and 2315 parts of 37% formalin solution is added dropwise 736 parts of 50% caustic soda at such a rate as to maintain a reaction temperature of 50°–55° C. This addition requires approximately two hours, but can be accelerated by employing external cooling. Upon completion of the caustic soda addition, the temperature is raised to 90° C. in order to complete the Cannizzaro reaction. The latter temperature is maintained for about one hour, or until the completion of the reaction is indicated by the appearance of a deep brown color. The pH of the solution is then adjusted to 6.0 by the addition of formic acid, after which the aqueous solution is concentrated by distillation at 100 mm. Hg pressure, 1404 parts of water being stripped overhead. At this point, stirring is discontinued, the product is allowed to layer out, and the two layers are separated mechanically.

To the upper layer (1567 parts) is added 2499 parts of methyl isobutyl ketone, after which, drying is completed at 100 mm. pressure by removing water from the methyl isobutyl ketone-water CBM. The temperature is then raised to 90°–95° C. and the mixture filtered by suction through a sintered glass funnel to remove any sodium formate which has separated from solution during the azeotropic drying. The filtrate is chilled to −10° C. and the crude triol (830 parts), which separates out as a crystalline solid, is recovered by filtration.

To the filtrate (2631 parts) is added the water layer (829 parts) from the initial separation, the recovered sodium formate, and 100 parts of water washings. The mixture is first dried at 100 mm. by removing water from the methyl isobutyl ketone-water CBM, then heated to 90°–95° C. and filtered as before to remove sodium formate. The filtrate (2487 parts) is then concentrated to a volume of 300–500 cc. by distillation at 100 mm., after which the concentrated solution is chilled to −10° C. The crude triol (130 parts) which crystallizes is recovered, as before, by filtration.

The over-all yield of crude material is 960 parts, or 73.7% of the theoretical amount. The yield based on material recrystallized from methylisobutylketone is 54.4% of the theoretical quantity. A sample of pure material had a melting point of 90–91° C. and the following analysis: Calculated: C, 57.6; H, 9.6; found: C, 57.6; H, 9.8.

EXAMPLE II

2-methyl-2-hydroxymethyl-4-pentenol

To a well-stirred mixture of 686 parts of 2-methyl-4-pentenal and 1200 parts of 37 percent formalin is added dropwise 563 parts of 50 percent caustic soda at a rate such that the reaction temperature is maintained at 50°–55° C. This addition requires varying periods of time depending on the amount of external cooling supplied. Upon completion of the caustic soda addition, the reaction temperature is raised to 90°–95° C. and maintained thereat for approximately one hour. At this point, the reaction mixture is neutralized with formic acid, stirring is discontinued, and the mixture is cooled to room temperature. The two phase system which results is separated mechanically and the organic layer (1165 parts) is charged to a refining still. Water (242 parts) is first removed at 20 mm. mercury pressure, whereupon the pressure is further reduced to 1 mm. and the product is stripped overhead. The yield of diol, distilling at 94°–95° C. under 1 mm. pressure, is 862 parts, or 83.7 percent of the theoretical quantity. A sample prepared in this manner had a boiling point of 94°–95° C. at 1 mm. of mercury and the following analysis: Calculated: C, 64.3; H, 10.8; found: C, 64.6; H, 11.0.

EXAMPLE III

2-ethyl-2-hydroxymethyl-4-pentenol

To a well-stirred mixture of 784 parts of 2-ethyl-4-pentenal and 1250 parts of 37 percent formalin solution is added dropwise 570 parts of 50 percent caustic soda at a rate such that the reaction temperature is maintained at 50°–55° C. Upon completion of the caustic soda addition, the reaction temperature is raised to 90°–95° C. and maintained thereat for one hour. The reaction mixture is then neutralized with formic acid and concentrated by removing 353 parts of water by distillation at 100 mm. The two phase system is then separated and to the organic layer (1125 parts) is added 200 parts of di-n-butyl ether. Drying of the organic layer is accomplished at 100 mm. mercury pressure by removing 111 parts of water from the n-butyl ether-water azeotrope. Upon completion of drying, the hot solution is filtered to remove 58 parts of sodium formate and the filtrate is refined by vacuum distillation. The yield of diol, boiling from 98°–102° C. at 1–2 mm. mercury pressure, is 748 parts or 82.8% of the theoretical quantity at a 98.7 percent conversion of 2-ethyl-4-pentenal. The refined distillate, on standing undisturbed for several days at room temperature, eventually sets to a white crystalline mass. A sample of the crystalline material had a melting point of 29°–30° C. and the following analysis: Calculated: C, 66.6; H, 11.1; found: C, 65.8; H, 11.3.

What is claimed is:

1. A process for preparing terminally unsaturated polyols having the general formula:

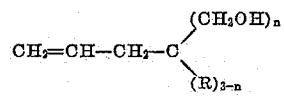

wherein (n) is a whole positive integer of from 2 to 3 and R is an unsubstituted alkyl group having from 1 to 10 carbon atoms, which comprises subjecting a mixture of a terminally unsaturated aldehyde and at least two moles of formaldehyde per mole of said unsaturated aldehyde to an aldol condensation at a temperature of from about 40° to about 70° C.; thereafter increasing said temperature to about 90° C. to complete the reaction; and recovering said terminally unsaturated polyol.

2. A process as claimed in claim 1 wherein the terminally unsaturated aldehyde is 2-methyl-4-pentenal.

3. A process as claimed in claim 1 wherein the terminally unsaturated aldehyde is 2-ethyl-4-pentenal.

4. A process as claimed in claim 1 wherein the terminally unsaturated aldehyde is 2-propyl-4-pentenal.

5. A process as claimed in claim 1 wherein the terminally unsaturated aldehyde is 2-butyl-4-pentenal.

6. A process for preparing 2,2-bis(hydroxymethyl)-4- pentenol which comprises subjecting a mixture of 4-pentenal and at least three moles of formaldehyde per mole of said 4-pentenal to an aldol condensation at a temperature of from about 40° to about 70° C.; thereafter increasing said temperature to about 90° C. to complete the reaction; and recovering said terminally unsaturated polyol.

7. 2,2-bis(hydroxymethyl)-4-pentenol.

References Cited in the file of this patent

UNITED STATES PATENTS

| | | |
|---|---|---|
| 2,292,926 | Brubaker et al. | Aug. 11, 1942 |
| 2,418,290 | Bruson et al. | Apr. 1, 1947 |

OTHER REFERENCES

Kharasch et al.: J. Org. Chem., vol. 14, pp. 86 and 89 (1949).